United States Patent [19]
Schmidt

[11] Patent Number: 5,730,676
[45] Date of Patent: Mar. 24, 1998

[54] THREE-MODE, INPUT-SPLIT HYBRID TRANSMISSION

[75] Inventor: Michael Roland Schmidt, Carmel, Ind.

[73] Assignee: General Motors Corporation, Detroit, Mich.

[21] Appl. No.: 735,280

[22] Filed: Oct. 22, 1996

[51] Int. Cl.[6] .................................................. F16H 3/72
[52] U.S. Cl. ........................... 475/5; 475/149; 477/5; 477/9
[58] Field of Search .................... 475/5, 149; 477/3, 477/4, 5, 6, 7, 8, 9

[56] References Cited

U.S. PATENT DOCUMENTS

| | | | |
|---|---|---|---|
| 4,479,404 | 10/1984 | Stockton | 475/149 |
| 5,508,574 | 4/1996 | Vlock | 475/149 X |
| 5,558,588 | 9/1996 | Schmidt | 475/5 |
| 5,558,595 | 9/1996 | Schmidt et al. | 477/3 |
| 5,562,565 | 10/1996 | Moroto et al. | 477/8 X |
| 5,571,058 | 11/1996 | Schmidt | 477/3 X |
| 5,577,973 | 11/1996 | Schmidt | 475/5 |
| 5,603,671 | 2/1997 | Schmidt | 475/5 |
| 5,655,990 | 8/1997 | Ooyama et al. | 477/8 X |

*Primary Examiner*—Khoi Q. Ta
*Assistant Examiner*—Peter T. Kwon
*Attorney, Agent, or Firm*—Donald F. Scherer

[57] ABSTRACT

An electro-mechanical transmission has interconnected simple planetary gear sets having one member connected to each of a pair of motor/generators and another member connectible with an engine through a selectively operable torque transmitting device. Three additional selectively operable torque transmitting devices cooperate with the gear sets, engine and/or the motor/generators to provide three modes of electro-mechanical power transmissions. One of the motor/generators is stationary, at one speed point in each of two modes, thereby providing two high efficiency operating points.

9 Claims, 4 Drawing Sheets

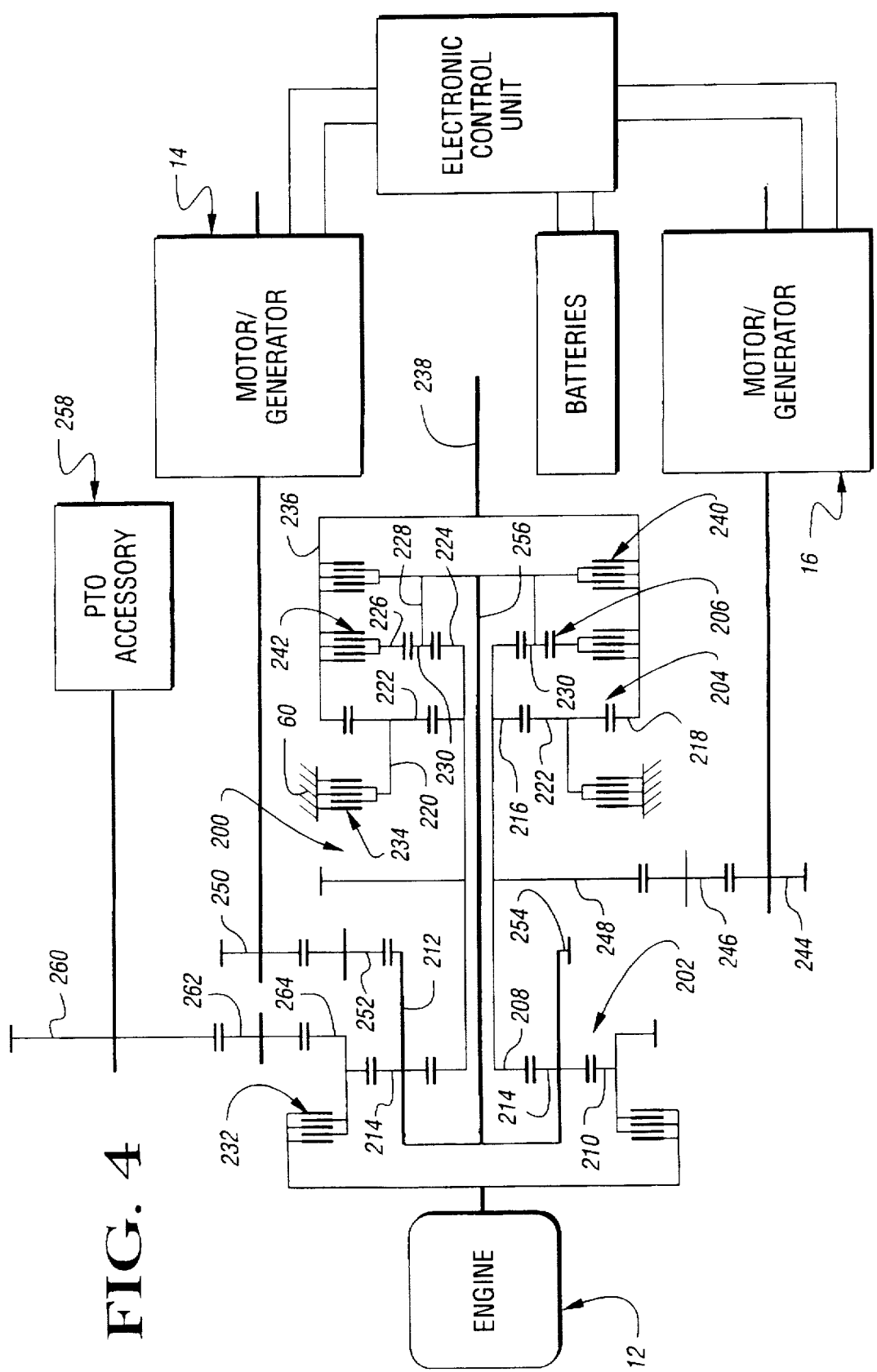

THREE-MODE, INPUT-SPLIT HYBRID TRANSMISSION

TECHNICAL FIELD

This invention relates to power transmissions, and more particularly, to parallel hybrid electro-mechanical power transmissions.

BACKGROUND OF THE INVENTION

Hybrid transmissions generally combine an internal combustion engine power source with an electrical or hydraulic power source to establish a continuously variable speed ratio between the transmission input shaft and a vehicle final drive mechanism. The ability to vary the speed ratio, improves the overall efficiency of the transmission by permitting the internal combustion power source to operate in the most efficient range. When an electro-mechanical hybrid transmission is employed, further advantages are realized in that a pure electric drive can be made available, thus reducing the exhaust emission for short periods of operation. When the electro-mechanical transmission also includes a plurality of gear members, the overall range of the transmission operation is extended.

SUMMARY OF THE INVENTION

It the primary object of the present invention to provide an improved electro-mechanical transmission having three modes of operation.

The present invention provides an electro-hydraulic transmission, wherein an internal combustion engine is coupled with two motor/generator units through at least two simple planetary gear sets. The gear sets are connected or controlled to transmit power through the selective actuation of four fluid operated friction torque transmitting mechanisms in the three modes of operation. In two of the operating modes, an input-split powertrain is provided and in the third mode a compound split powertrain is provided. During the higher two modes of operation, one of the motor/generator units passes through a zero speed condition which establishes a mechanical reaction point in the planetary gear set. At these mechanical reaction points, the transmission provides high efficiency because the electrical losses are minimal. These reaction points can, through judicious gear selection, be established at desirable operating points for a given vehicle duty cycle.

In one aspect of the invention, an internal combustion engine, two motor/generators and two simple planetary gear sets are combined. The combustion engine is connected through a first friction clutch to the ring gear of the first planetary and through a second friction clutch to the carrier assembly of the second planetary. A friction brake establishes a reaction in the second planetary during the first mode of operation. A third friction clutch connects on of the motor/generators to the output in the second mode of operation, and the simultaneous engagement of the first and second clutches provides the third mode of operation.

The first clutch is engaged during the first mode and the second mode also. An electronic control unit establishes the proper relations between the motor/generators and/or between each motor/generator and the source of electrical power which, in the preferred embodiment, is batteries.

BRIEF DESCRIPTION OF THE DRAWINGS

FIG. 4 is a schematic representation of a further embodiment of the present invention.

DESCRIPTION OF THE EXEMPLARY EMBODIMENTS

Figure 1:
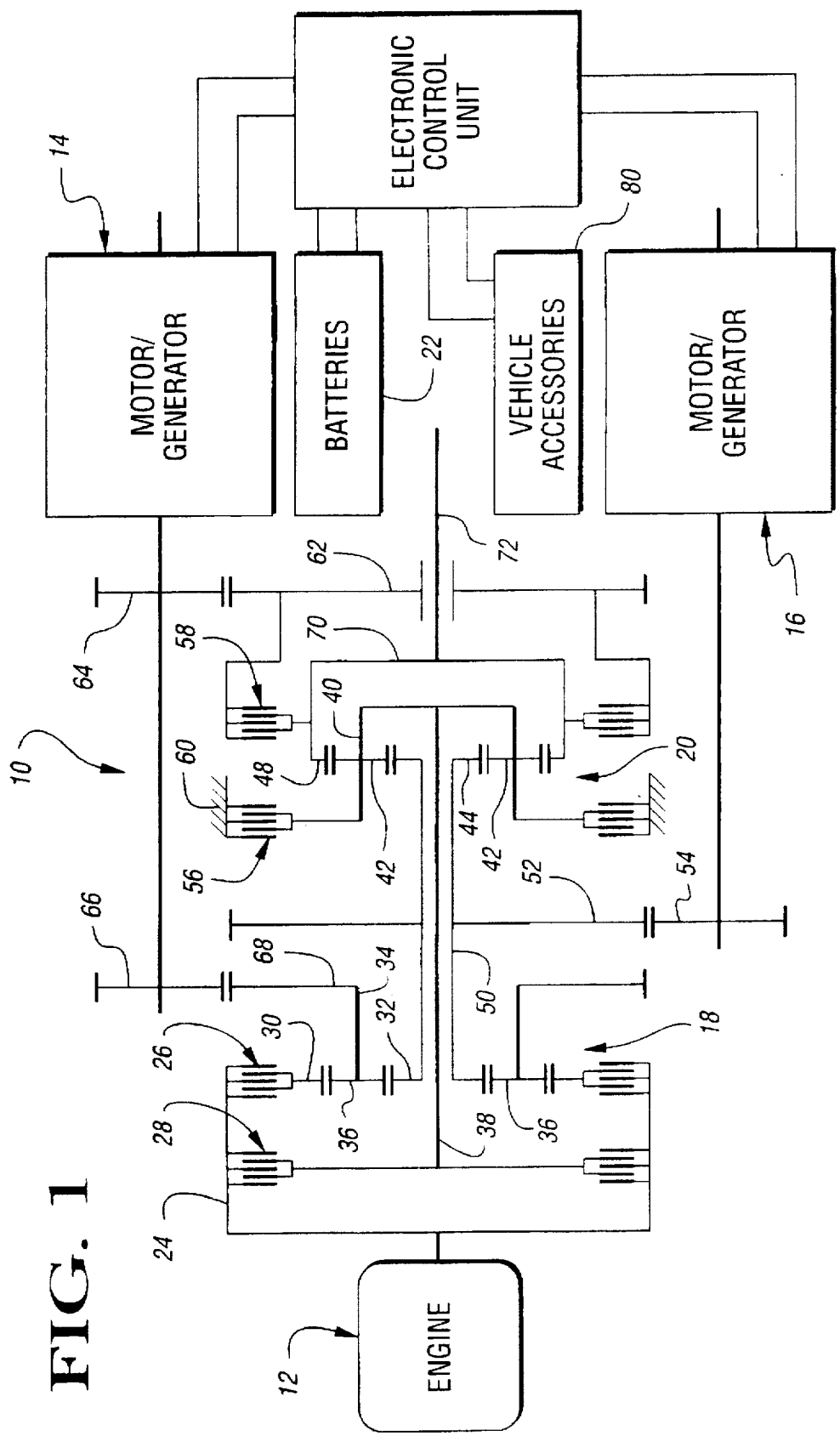
FIG. 1 is a schematic representation of the transmission incorporating one embodiment of the present invention.

Referring to the drawings, wherein like characters represent the same or corresponding parts throughout the several views, there is seen in FIG. 1, an electro-mechanical transmission, generally designated 10, which includes an engine or internal combustion power source 12, a first motor/generator (M/G) 14, a second motor/generator (M/G) 16, a first simple planetary gear set 18, a second simple planetary gear set 20, a plurality of batteries 22, an electronic control unit ECU.

The engine 12 is drivingly connected to a hub 24, which in turn is operatively connected with a pair of torque transmitters or clutches 26 and 28. The clutch 26 is also connected with a ring gear 30, which is a member of the planetary gear set 18. Also included in the planetary gear set 18 is a sun gear 32, a carrier assembly 34 on which is rotatably mounted a plurality of pinion gears 36 meshing with the ring gear 30 and the sun gear 32.

The clutch 28 is operatively connected with a shaft member 38 which is drivingly connected for continuous rotation with a carrier assembly 40 of the planetary gear set 20. The planetary gear set 20 also has a plurality of pinion gears 42 which make up a portion of the carrier assembly 40 and mesh respectively with a sun gear 44 and a ring gear 48. The sun gear 44 is also connected via a sleeve shaft 50 with the sun gear 32 of planetary gear set 18 and through a pair of transfer gears 52, 54 with the M/G 16.

The carrier assembly 40 is operatively connected with a torque transmitting device or brake 56 and the ring gear 48 is connected with a torque transmitting device or clutch 58. The torque transmitting devices 26, 28, 56 and 58 are conventional disc type friction devices which are operated through the pressurization of the piston member. The operation of such devices is well known. It is also well known that the devices, when energized or engaged, will transmit torque between two components. The brake 56, for example, will transmit torque between the carrier assembly 40 and a transmission housing 60 when engaged, while the torque transmitting device 26 will transmit torque between the engine 12 and the ring gear 30 when engaged.

The torque transmitting device 58 is drivingly connected for continuous rotation with a transfer gear 62 which in turn meshes with a transfer gear 64 which is connected for rotation with the M/G 14. Thus, when the clutch 58 is engaged, the ring gear 48 is drivingly connected with the M/G 14. The M/G 14 also is drivingly connected with a transfer gear 66 which rotatably meshes with a transfer gear 68 which in turn is secured for rotation with the carrier assembly 34. Thus, the carrier assembly 34 continually rotates with the M/G 14 and, as previously described, the sun gears 32 and 44 continuously rotate with the M/G 16.

The ring gear 48 is drivingly connected through a hub 70 which in turn is connected with an output shaft 72. The M/G 14 and M/G 16 are controlled in operation by an electronic control unit (ECU) which accepts power from the batteries 22 for delivery to the M/G units. The ECU further provides electrical connections between the M/G units whenever one might operate as a generator while the other is operating as a motor. The ECU also permits the M/G units to supply power to the batteries when they are operating as generators to thereby recharge the batteries.

The hybrid transmission 10 provides three modes of operation between the engine 12 and the output shaft 72. These three modes are defined in part by the curves shown in the graph of FIG. 2. A curve 74 represents engine speed, a curve 76 represents the speed of M/G 16, and a curve 78 represents the speed of M/G 14. The "X" axis is vehicle speed and the "Y" axis is unit speed. Since the M/G units can rotate either positively or negatively, that is, clockwise or counterclockwise, the "X" axis has both positive and negative speed designations.

During the first mode of operation, which is an input-split mode, the engine speed is increased from an idle level to the desired operating level which is approximately 2000 rpm. While the engine speed is at idle, the M/G unit 16 has a speed in the negative direction while the M/G unit 14 has a speed in the positive direction. To increase the output speed of the vehicle, the engine speed is, as represented by curve 74, is increased in a positive direction while the speed of M/G 16 is increased in a negative direction and the speed of M/G 14 is increased in a positive direction. During this mode of operation, the M/G 16 unit operates as a motor and the M/G 14 unit operates as a generator.

To provide for reactions within the planetary gear sets 18 and 20, the clutch 26 and brake 56 are engaged. Thus, the engine supplies power to the output shaft as does the M/G 16. The engine 12 also supplies power via the carrier assembly 34 and the transfer gears 68 and 66 to M/G 14 which in turn is controlled by the ECU to deliver power to either the batteries 22 or the M/G unit 16, depending upon the power requirements of the vehicle. The ECU, it should be noted, also supplies power from either the batteries or the M/G units to a plurality of vehicle accessory drives 80.

Figure 2:
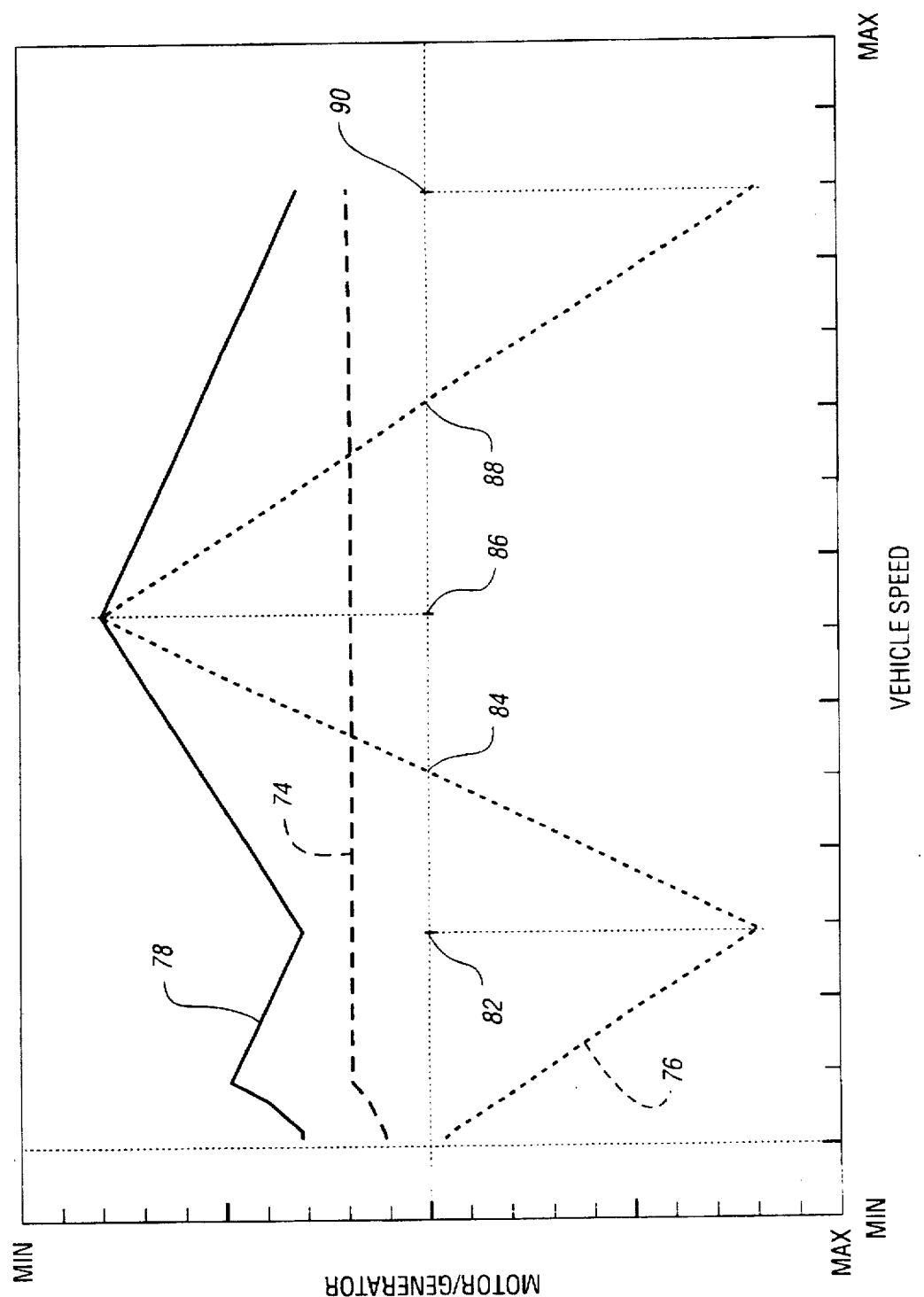
FIG. 2 is a graphical representation of some of the performance characteristics of the engine and motor/generator elements of FIG. 1.

When the vehicle reaches its maximum speed in the first mode, represented by point 82, on the graph of FIG. 2, the torque transmitter brake 56 is disengaged while the torque transmitter or clutch 58 is engaged. At this time, the M/G unit 16 becomes a generator and the M/G unit 14 becomes a motor. Thus, in the second mode, power is supplied from the engine 12 to both the output 72 and to the M/G unit 16. The M/G unit 14 supplies power to the output shaft 72 through the clutch 58. The output of M/G 16 acting as a generator is distributed appropriately by the ECU.

The speed of the M/G unit 16 decreases in negative value toward zero until at point 84, the speed of the M/G unit 16 is zero. At this point, there is a mechanical reaction point within the planetary gear arrangement. In other words, the sun gears 32 and 44 are stationary. When this occurs, the engine power is distributed from the ring gear 30 through the carrier assembly 34 and the transfer gears 66, 68 to the transfer gears 64, 62 and is combined therewith with the power output of M/G 14 for delivery to the output shaft 72.

If the engine 12 is capable of outputting sufficient horsepower to operate the vehicle at this point, the M/G 14 can be controlled with zero electrical input by the ECU unit and therefore all of the power transmission, except for the reaction requirement at the sun gears 32 and 44, will be mechanical and electrical power losses at a minimum.

In the second mode, as the vehicle output speed continues from point 84 to the end of mode two at point 86, the M/G 16 operates as a motor. Also, during a portion of this part of the second mode of operation, the M/G 14 operates as a motor through a portion and as a generator through the second portion of the second mode. Therefore, at point 86, the M/G 14 is operating as a generator while the M/G 16 is operating as a motor. At point 86, the clutch 58 is disengaged and the clutch 28 is engaged. The M/G 14 operates as a motor to provide an increase in output speed. The M/G 16 operates as a generator to supply electrical power to either operate the M/G 14 or charge the batteries as directed by the ECU. The speed of M/G 16 continually decreases until it is again at zero at point 88 on the vehicle speed axis.

At this point, it should be appreciated, that again, a mechanical reaction is present in the planetary gear sets 18 and 20. During this point of mechanical reaction, the engine transmits power through the clutch 28 to the carrier 40 and thereby, due to the planetary action of planetary gear set 20 to the ring gear 48 and the output shaft 72. The M/G 14 can also supply power through the carrier assembly 34, clutch 26 and clutch 28 to the carrier assembly 40. Thus, both the engine 12 and the M/G unit 14 can supply power to the output shaft 70 at the mechanical reaction point 88. The vehicle speed is increased beyond the point 88 by operating the M/G 16 as a motor and M/G 14 as a motor. Thus, both motor/generator units supply power from the batteries to the output shaft when maximum power output is desired. That is, if the vehicle must operate under maximum tractive effort, then both units operate as motors and draw power from the batteries 22.

As the vehicle speed approaches a maximum value at point 90, the M/G 14 becomes a generator and the M/G 16 continues to operate as a motor. Thus, for the final portion of the third mode of operation, the M/G 14 supplies electrical power to the system so that the M/G 16 will have sufficient power output to drive the vehicle at maximum speed and maximum load capacity.

The clutches 26, 28 and 58 and the brake 56 are shifted under synchronous conditions. That is, the speed of both sides of the friction unit, both before and after the shift, are identical. Thus, at the interchange between the first mode and second mode, output speed 82, the brake 56 is disengaged while the clutch 58 is engaged. It should be noted that the input side of clutch 58 is rotating at a speed proportional to the speed of M/G 14 while the output side of clutch 58 is rotating at the speed of output shaft 72. At this mode change point, the speed of the ring gear 48 and the speed of the input side of the clutch 58 are identical and therefore there is no slippage between the interleaved friction discs of the clutch 58. The same is true on a shift to the third mode, when clutch 58 is disengaged and the clutch 28 is engaged.

Figure 3:
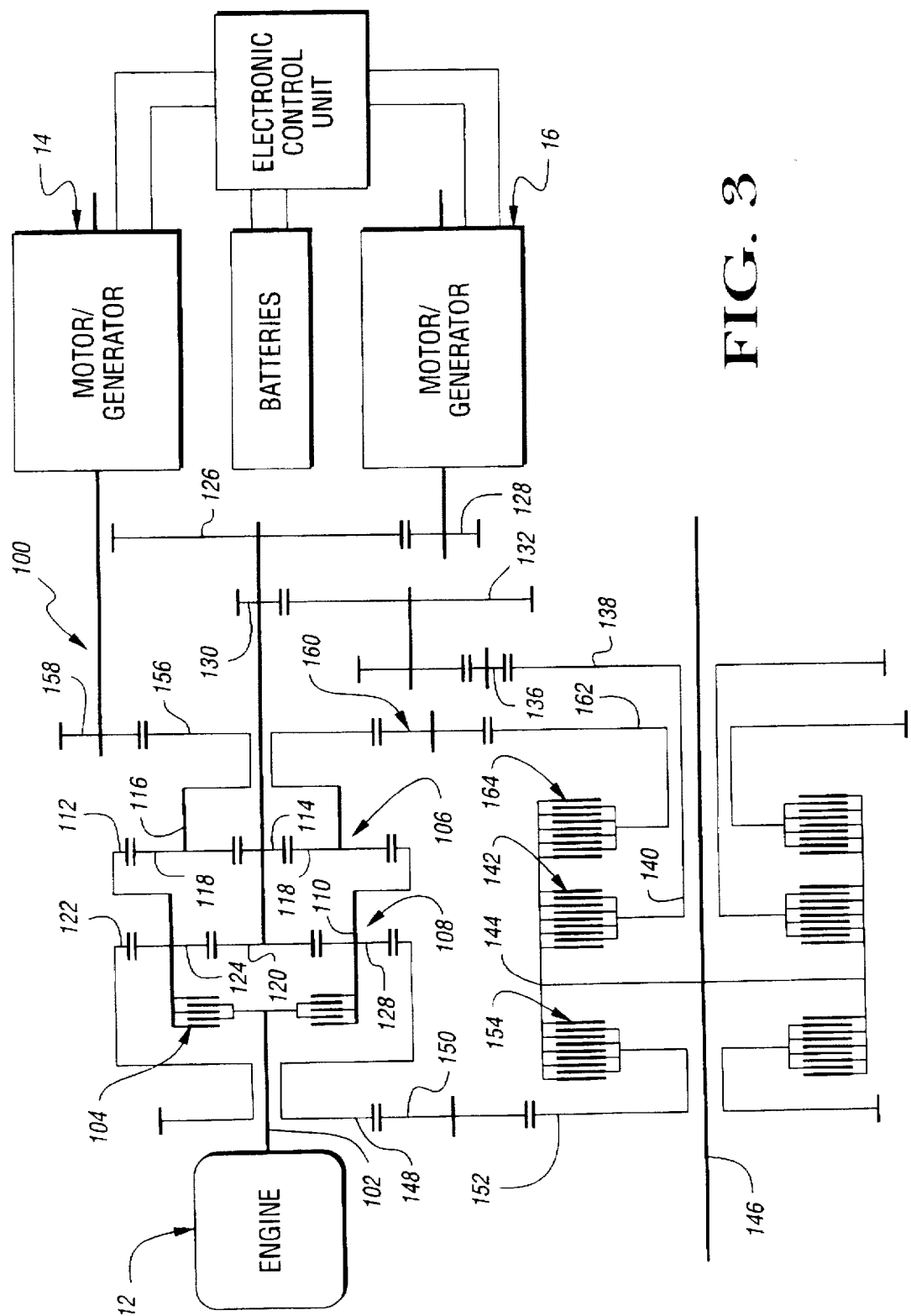
FIG. 3 is a schematic representation of another embodiment of the present invention.

There is seen in FIG. 3, an electro-mechanical hybrid transmission 100. This transmission has an input shaft 102 driven by the engine 12 and driving an input side of a torque transmitter or clutch assembly 104. The transmission 100 also includes a first simple planetary gear arrangement 106 and a second simple planetary gear arrangement 108. The output side of the clutch 104 is connected to a carrier assembly 110 of the planetary 108 and a ring gear 112 of the planetary 106. The planetary 106 further includes a sun gear 114 and a carrier assembly 116 which has a plurality of pinion gears 118 rotatably mounted thereon meshing with the sun gear 114 and ring gear 112.

The planetary arrangement 108 also includes a sun gear 120 and a ring gear 122 which mesh with a plurality of pinion gears 124 rotatably mounted on the carrier assembly 110. The sun gear 120 and sun gear 114 are connected together for continuous rotation and also connected through transfer gears 126 and 128 with the M/G 16. The sun gears 120 and 114 are also connected for continuous rotation with a gear train comprised of transfer gears 130, 132, 134, 136 and 138 which is connected with a sleeve shaft 140 which in turn is connected with an input side of a torque transmitter or clutch assembly 142. The clutch assembly 142 is connected with a hub 144 which in turn is drivingly connected with a transmission output shaft 146.

The ring gear 122 is connected through a transfer gear train consisting of transfer gear 148, transfer gear 150 and transfer gear 152. The transfer gear 152 is connected to the input side of a torque transmitter or clutch assembly 154 which has the output side thereof connected with the hub 144 and therefore output shaft 146.

The carrier assembly 116 is connected through a transfer gear assembly including gear 156 and gear 158 with the M/G 14 and through a transfer gear assembly including gear 156, transfer gear 160 and transfer gear 162 with the input side of a torque transmitter or clutch 164 which has the output side thereof drivingly connected with the hub 144.

The major difference between the hybrid transmission 100, shown in FIG. 3, and the hybrid transmission 10, shown in FIG. 1, is the fact that the hybrid transmission 100 utilizes four clutches as the torque transmitting devices while the transmission 10 has three clutches and one brake. However, the operation of the unit is essentially the same in that it provides an input-split mode for the first mode, an input-split mode for the second mode, and a compound split mode for the third mode.

During the first mode, the clutch 104 and 142 are engaged and, it can be seen that both the internal combustion engine 12 and the M/G 16 supply power to the output shaft via the clutches 104 and 142, respectively. It should also be appreciated that the M/G 14 can be driven by the planetary gear set 106 to supply power to the ECU for distribution to the batteries for the MG unit 16.

In the second mode, the torque transmitter 164 is engaged by the torque transmitter 142 is disengaged, such that the M/G unit 14 can supply power directly to the output shaft while the engine 12 can also supply power to the output shaft through the clutch 104 and carrier assembly 116. The M/G unit 16 will act as a generator through a portion of the second mode and will also pass through a zero mechanical point, with reference to the vehicle speed, similar to that described in FIG. 2, above.

To establish the third mode of operation, the torque transmitter 164 is disengaged while the torque transmitter 154 is engaged, and the power to the output shaft 146 can be delivered from the engine and both M/G units 14 and 16. It is also possible, from this third mode of operation, to permit one of the M/G units to operate as a generator if that power is needed to provide the maximum vehicle speed under maximum operating load. Also, during the third mode of operation, another zero mechanical point is achieved by the M/G unit 16 thereby providing an efficient operating point during the second and third modes of operation.

While the transmission 100 does not show or suggest that a plurality of accessories are to be driven by either the batteries or some other unit within the transmission, such an inclusion is possible and is well within the art.

In FIG. 4, an electro-mechanical transmission 200 is depicted. This transmission includes three simple planetary gears 202, 204 and 206. The simple planetary gear 202 includes a sun gear 208, a ring gear 210 and a carrier assembly 212 which has a plurality of rotatably mounted pinions 214 meshing with the sun gear 208 and ring gear 210. The simple planetary gear 204 includes a sun gear 216, a ring gear 218, a carrier assembly 220 on which is rotatably mounted a plurality of pinion gears 222 meshing with the sun gear 216 and ring gear 218. The simple planetary gear 206 includes a sun gear 224, a ring gear 226 and a carrier assembly 228. The carrier assembly 228 has a plurality of rotatably mounted pinions 230 which mesh with the sun gear 224 and the ring gear 226.

The engine 12 is connected with a torque transmitter or clutch 232 which has the output side thereof connected with the ring gear 210. The carrier assembly 220 is drivingly connected with a selectively operable torque transmission or brake 234 which has one side thereof connected to the transmission housing 60. The ring gear 218 is drivingly connected through a hub 236 with an output shaft 238. The hub 236 is connected to the input side of a pair of torque transmitters or clutches 240 and 242.

The M/G unit 16 is connected through a transfer gear 244, a transfer gear 246 and a transfer gear 248 to the interconnected sun gears 208, 216 and 224. The M/G unit 14 is connected through a transfer gear 250, a transfer gear 252 and a transfer gear 254 with the carrier assembly 212 and through a shaft 256 with the carrier assembly 228 and the input side of clutch 240. The output side of clutch 242 is connected with the ring gear 226.

An accessory drive 258 is supplied with power through a transfer gear 260, a transfer gear 262 and a transfer gear 264. The transfer gear 264 is driven in unison with the ring gear 210 and may be driven by either the engine 12 through clutch 232 or through a combination of the electrical units driving through the ring gear 210. The operation of the transmission 200 is similar to the above described operation for transmission 10 and 100.

In the first mode of operation, the clutch 232 and brake 234 are engaged, such that the carrier assembly 220 provides a reaction point within the transmission for delivery of power from both the engine 12 and the M/G unit 16 to the output shaft 238. During the second mode of operation, the brake 234 is disengaged while the clutch 240 is engaged, and the power supply to the output with the M/G unit 14 acting as a motor and the M/G unit 16 acting as a generator.

Also in the second mode, a zero reaction point is achieved at the M/G unit 16, such that an efficient point of vehicle operation is established. Following the zero reaction point for the M/G unit 16, the unit becomes a motor during the remaining portion of the second mode. The change from the second mode of operation to the third mode, the clutch 240 is disengaged while the clutch 242 is engaged. During this mode of operation, the M/G unit 14 operates as motor while during the first portion, the M/G unit 16 operates as a generator.

Also during the third mode of operation, there is a zero reaction point at the M/G unit 16, which provides an efficient operating point in the third mode of power transmission. The power transmission following the zero point for M/G unit 16 out to maximum vehicle speed finds the M/G unit 16 operating as a motor and, except for the very extreme vehicle speeds, the M/G unit 14 also operates as a motor.

In all of the transmissions 10, 100 and 200 described above, the clutches and brakes are interchanged at synchronous speeds. As described above for FIG. 1, the clutches input and output sides are rotating at identical speeds both before and after the mode change. Thus, the clutches are engaged with zero speed differential and therefore zero torque transmission until the clutch is fully engaged and the off-going clutch is fully released.

These types of shifts will improve the life of the friction devices. Since slippage does not occur during engagement, there is no wear at the mating clutch surfaces. With each of the transmissions, there are provided two operating points at which the output speed of M/G unit 16 is zero. These operating points can be designed to be at desirable vehicle speeds for the particular vehicle speeds for the particular vehicle to be operated with the transmission. For example, if the unit is to be used with a highway vehicle, the zero speed of M/G unit 16 will be designed to occur at the speed with which the vehicle is to be operated on the highway, i.e., the "cruising speed". The zero speed point of the M/G 16 during the second mode, would be designed to be commensurate with a less rapid output speed, such as an interurban driving speed.

Obviously, the transfer clutch mechanisms and the planetary ratios can be adjusted to provide various operating curves. In the transmission 10, the ring/sun ratio for planetary 18 is 2.33; in the ring/sun ratio of planetary 20 is 2.49. All of the transfer gears have a ratio of 4.04. This can be contrasted with the gearing of transmission 100, where the ratio in planetary 106 is 4.0 while the ratio in planetary 108 is 2.84. The transfer gear ratio between 158 and 156 is 4.39 while the transfer ratio between gears 156 and 162 is 1.31. The transfer ratio between gears 128 and 126 is 2.23 and the transfer ratio between gears 134 and 138 is 4.0. The transfer ratio between gears 148 and 152 is 1.45.

This can be further compared with the gearing of transmission 200, where the ratio in planetary 202 is 6.0; the ratio of planetary 204 is 7.09 and the ratio of planetary gear 206 is 1.875. The transfer ratio between gears 250 and 254 is 5.71; the transfer ratio between gears 244 and 248 is 1.89. The transmission 10 utilizing an engine speed of 2000 rpm is capable of achieving a vehicle speed of approximately 63 miles per hour.

The transmission powertrain utilizing transmission 200 has an engine speed of 1700 rpm and is capable of achieving maximum vehicle speed of approximately 60 miles per hour. A powertrain utilizing the transmission 100 has an engine speed of 2500 rpm and is capable of achieving a maximum vehicle speed of approximately 62 miles per hour. In this transmission, the zero operating speed points for M/G 14 are at approximately 30 miles per hour and 49 miles per hour. The zero operating speeds for a powertrain utilizing transmission 200 are at approximately 25 miles per hour and 40 miles per hour. The powertrain utilizing the transmission 10 has the M/G 16 reaction points at approximately 25 miles per hour in mode two and 50 miles an hour in mode three. Thus, it should be appreciated that, depending upon the engine to be utilized and the specific gear ratios of the respective transmissions, a plurality of vehicle performance curves can be satisfied. Also, with each of these transmissions, the engine clutch can be disconnected and the engine can be shut down. The vehicle can now operate on battery power alone in all three ranges. In FIG. 4, even the accessory drive can be active through combinations of motor/generators 14 and 16.

Obviously, many modifications and variations of the present invention are possible in light of the above teaching. It is therefore to be understood, that within the scope of the appended claims, the invention may be practiced otherwise than as specifically described.

I claim:

1. An electro-mechanical transmission comprising:
   input means for receiving power from an engine;
   power output means
   first and second motor/generators
   energy storage means for accepting power from, and supplying power to, said first and second motor/generators;
   control means for regulating power flow between said energy storage means and said motor/generators as well as between said first and second motor/generators;
   a first simple planetary gear set having a plurality of members including a ring gear, a sun gear and a carrier assembly having a plurality of pinion gears each meshing with both said sun gear and said ring gear;
   a second simple planetary gear set having a plurality of members including a ring gear, a sun gear and a carrier assembly having a plurality of pinion gears each meshing with both said sun gear and said ring gear;
   said sun gears of said first simple planetary gear set and said second simple planetary gear set being continuously interconnected with each other and with said second motor/generator, said carrier assembly of said first simple planetary gear set being continuously connected with said first motor/generator;
   first means operatively to connect said ring gear of said second simple planetary gear set with said power output means;
   first torque transmitting device effecting an operative connection between said input means and said ring gear of said first simple planetary gear set;
   second torque transmitting device effecting an operative connection to establish a first range power path between said second motor/generator and said power output means in cooperation with said first torque transmitting device;
   third torque transmitting device effecting an operative connection to establish a second range power path between said first motor/generator and said power output means in cooperation with said first torque transmitting device;
   second means including said first means effecting an operative connection to establish a third range power path, in cooperation with said first torque transmitting device, between said input means and said output means.

2. The electro-mechanical transmission defined in claim 1 further including a third simple planetary including a sun gear connected with the sun gears of said first and second planetary gear sets, a ring gear connected with said second means and a carrier assembly connected with the carrier assembly of the first simple planetary gear set.

3. The electro-mechanical transmission defined in claim 1 wherein said second means includes a fourth torque transmitting device.

4. The electro-mechanical transmission defined in claim 3 wherein the first third and fourth torque transmitting devices are selectively engageable friction clutches.

5. The electro-mechanical transmission defined in claim 3 wherein said four torque transmitting devices are selectively engageable friction clutches.

6. An electro-mechanical transmission comprising:
   input means for receiving power from an engine;
   power output means;
   first and second motor/generators;
   energy storage means for accepting power from, and supplying power to, said first and second motor/generators;
   control means for regulating power flow between said energy storage means and said motor/generators as well as between said first and second motor/generators;
   first and second simple planetary gear sets each having members including a ring gear, a sun gear and a carrier assembly having a plurality of pinion gears each meshing with both said sun gear and said ring gear;

means operatively to continuously connect a first member of said first simple planetary gear set with a first member of said second simple planetary gear set and with said second motor/generator;

means operatively to continuously connect said first motor/generator with a second member of said first simple planetary gear set;

means operatively to continuously connect a second member of said second simple planetary gear set with said power output means;

a first torque transmitting device effecting an operative connection between said input means and a third member of said first simple planetary gear set;

a second torque transmitting device effecting an operative connection between said input means and a third member of said second simple planetary gear set;

a third torque transmitting device effecting an operative connection between said third member of said second simple planetary gear set and a stationary member;

a fourth torque transmitting device effecting an operative connection between said first motor/generator and said second member of said simple planetary gear set;

said first torque transmitting device and third torque transmitting device cooperating to establish a first range of power transmission, said first torque transmitting device and said fourth torque transmitting device cooperating to establish a second range of power transmission, and said first torque transmitting device and said second torque transmitting device cooperating to establish a third range of power transmission.

7. The electro-mechanical transmission defined in claim 6 wherein said first torque transmitting device is a friction clutch, said second torque transmitting device is a friction clutch and wherein said second motor/generator is stationary at one output speed during said third range of power transmission.

8. The electro-mechanical transmission defined in claim 7 wherein said second motor/generator is stationary at one output speed during said second range of power transmission.

9. The electro-mechanical transmission defined in claim 6 wherein said first members of said first and second simple planetary gear sets are the respective sun gear, said second members of the first and second simple planetary gear sets are the respective carrier assembly and ring gear, and the third members of the first and second simple planetary gear sets are the respective ring gear and carrier assembly.

* * * * *